(12) United States Patent
Takagi

(10) Patent No.: US 10,359,693 B2
(45) Date of Patent: Jul. 23, 2019

(54) LIGHT SOURCE APPARATUS AND PROJECTOR

(71) Applicant: SEIKO EPSON CORPORATION, Tokyo (JP)

(72) Inventor: Kunihiko Takagi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/945,060

(22) Filed: Apr. 4, 2018

(65) Prior Publication Data

US 2018/0292740 A1    Oct. 11, 2018

(30) Foreign Application Priority Data

Apr. 6, 2017   (JP) ................................. 2017-075910

(51) Int. Cl.
*G03B 21/20*     (2006.01)
*G03B 21/16*     (2006.01)

(52) U.S. Cl.
CPC ........... *G03B 21/204* (2013.01); *G03B 21/16* (2013.01); *G03B 21/208* (2013.01); *G03B 21/2066* (2013.01); *G03B 21/2073* (2013.01)

(58) Field of Classification Search
CPC .... G03B 21/16; G03B 21/145; G03B 21/204; G03B 21/208; G03B 21/2013; G03B 21/2066; H04N 9/3111; H04N 9/3114; H04N 9/3141; H04N 9/3144; H04N 9/3155
See application file for complete search history.

(56) References Cited

U.S. PATENT DOCUMENTS

| 9,866,807 B2 * | 1/2018 | Li ............................. F21V 9/40 |
| 9,915,418 B2 * | 3/2018 | Yamagishi ............. G03B 33/08 |
| 2007/0103647 A1 * | 5/2007 | Egawa ................... G03B 21/16 |
| | | 353/54 |
| 2011/0304829 A1 | 12/2011 | Enomoto et al. |
| 2013/0250546 A1 * | 9/2013 | Hu ............................ F21V 9/40 |
| | | 362/84 |

(Continued)

FOREIGN PATENT DOCUMENTS

| JP | 2011-054759 A | 3/2011 |
| JP | 2011-134619 A | 7/2011 |

(Continued)

*Primary Examiner* — Sultan Chowdhury
(74) *Attorney, Agent, or Firm* — Oliff PLC

(57) ABSTRACT

A light source apparatus includes a light emitter that emits excitation light, a support member having an accommodation space on the optical path of the excitation light, a light guide system provided on the optical path in the accommodation space, and a wavelength conversion element provided on the optical path of the excitation light having passed through the light guide system and including a phosphor layer, a substrate that supports the phosphor layer, and a light reflection surface provided between the phosphor layer and the substrate. The substrate is so supported by the support member that the phosphor layer faces the light guide system. The substrate is thermally connected to the support member, and the support member includes a light exit section that transmits fluorescence emitted from the phosphor layer.

20 Claims, 10 Drawing Sheets

(56) References Cited

U.S. PATENT DOCUMENTS

| | | | |
|---|---|---|---|
| 2016/0073068 A1* | 3/2016 | Miyazaki | H04N 9/3111 353/31 |
| 2017/0097559 A1 | 4/2017 | Takagi | |
| 2017/0184949 A1 | 6/2017 | Takagi et al. | |

FOREIGN PATENT DOCUMENTS

| | | |
|---|---|---|
| JP | 2012-003224 A | 1/2012 |
| JP | 2013-025212 A | 2/2013 |
| JP | 2015-040870 A | 3/2015 |
| JP | 2016-127145 A | 7/2016 |
| JP | 2017-072671 A | 4/2017 |
| JP | 2017-120348 A | 7/2017 |
| JP | 2017-138376 A | 8/2017 |

* cited by examiner

LIGHT SOURCE APPARATUS AND PROJECTOR

BACKGROUND

1. Technical Field

The present invention relates to a light source apparatus and a projector.

2. Related Art

In recent years, there is a light source apparatus that is the combination of a solid-state light source, such as a semiconductor laser, and a phosphor layer (see JP-A-2011-134619, for example).

The phosphor layer, when the temperature thereof increases, cannot efficiently produce fluorescence. In the light source apparatus described above, heat dissipating fins are provided on the rear surface of a support substrate that supports the phosphor layer to cool the phosphor layer. Providing the heat dissipating fins, however, requires a large space on the side facing the rear surface of the support substrate, undesirably resulting in an increase in the size of the light source apparatus.

SUMMARY

An advantage of some aspects of the invention is to provide a light source apparatus that is compact and allows efficient cooling of a phosphor layer. Another advantage of some aspects of the invention is to provide a projector including the light source apparatus.

According to a first aspect of the invention, a light source apparatus is provided. The light source apparatus includes a light emitter that emits excitation light, a support member having an accommodation space on an optical path of the excitation light, a light guide system provided on the optical path in the accommodation space, and a wavelength conversion element provided on the optical path of the excitation light having passed through the light guide system and including a phosphor layer, a substrate that supports the phosphor layer, and a light reflection surface provided between the phosphor layer and the substrate. The substrate is so supported by the support member that the phosphor layer faces the light guide system. The substrate is thermally connected to the support member. The support member includes a light exit section that transmits fluorescence emitted from the phosphor layer.

In the light source apparatus according to the first aspect, since the substrate and the support member are thermally connected to each other, the heat in the phosphor layer can be efficiently dissipated via the support member. No heat sink therefore needs to be disposed on the rear surface of the substrate, whereby the size of the light source apparatus can be reduced. A compact light source apparatus that allows efficient cooling of the phosphor layer can therefore be provided.

In the first aspect described above, it is preferable that the light source apparatus further includes a cooler for dissipating heat generated by the light emitter and a heat transporting member provided as part of the support member and including a heat receiver and a heat dissipater, that the heat receiver receives heat generated in the phosphor layer, and that the heat dissipater transfers the heat to the cooler.

According to the configuration described above, the heat in the phosphor layer can be efficiently dissipated.

In the first aspect described above, it is preferable that the support member has a first surface that supports the substrate and a second surface extending in a direction that intersects the first surface, and that the cooler is provided on the second surface.

The configuration described above, in which the cooler is provided on the second surface of the support member, can prevent the size of the light source apparatus from increasing in the direction perpendicular to the first surface.

In the first aspect described above, it is preferable that the support member has an opening that transmits the excitation light, that the substrate is so supported by the support member as to cover the opening from a side facing an exterior of the support member, and that the heat receiver is provided in an area inside an outer circumference of the substrate.

According to the configuration described above, the heat receiver can efficiently receive the heat in the phosphor layer.

In the first aspect described above, it is preferable that the light source apparatus further includes a thermally conductive material provided between the substrate and the support member, that the support member has an opening that transmits the excitation light, that the substrate is so supported by the support member as to cover the opening from a side facing an exterior of the support member, that the substrate is in contact with the support member in an area that surrounds the phosphor layer, and that the thermally conductive material is provided in an area outside an area where the substrate is in contact with the support member.

According to the configuration described above, since the thermally conductive material is disposed in an area outside the contact area where the substrate is in contact with the support member, the phosphor layer can be isolated from gas and foreign matter emitted from the thermally conductive material. Problems of a decrease in the light conversion efficiency and damage of the phosphor layer due to contamination of the surface of the phosphor layer can therefore be avoided.

In the first aspect described above, it is preferable that the light source apparatus further includes a thermally conductive material provided between the substrate and the support member, that the substrate is in contact with the support member in an area that surrounds the phosphor layer, and that the thermally conductive material is provided in an area outside an area where the substrate is in contact with the support member.

According to the configuration described above, since the thermally conductive material is disposed in an area outside the contact area where the substrate is in contact with the support member, the phosphor layer can be isolated from gas and foreign matter emitted from the thermally conductive material. Problems of a decrease in the light conversion efficiency and damage of the phosphor layer due to contamination of the surface of the phosphor layer can therefore be avoided.

According to a second aspect of the invention, a projector is provided. The projector includes the light source apparatus according to the first aspect described above, a light modulator that modulates illumination light from the light source apparatus in accordance with image information to produce image light, and a projection system that projects the image light.

Since the projector according to the second aspect includes the light source apparatus that is compact and allows efficient cooling of the phosphor layer, the projector itself can be compact and project bright image light.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
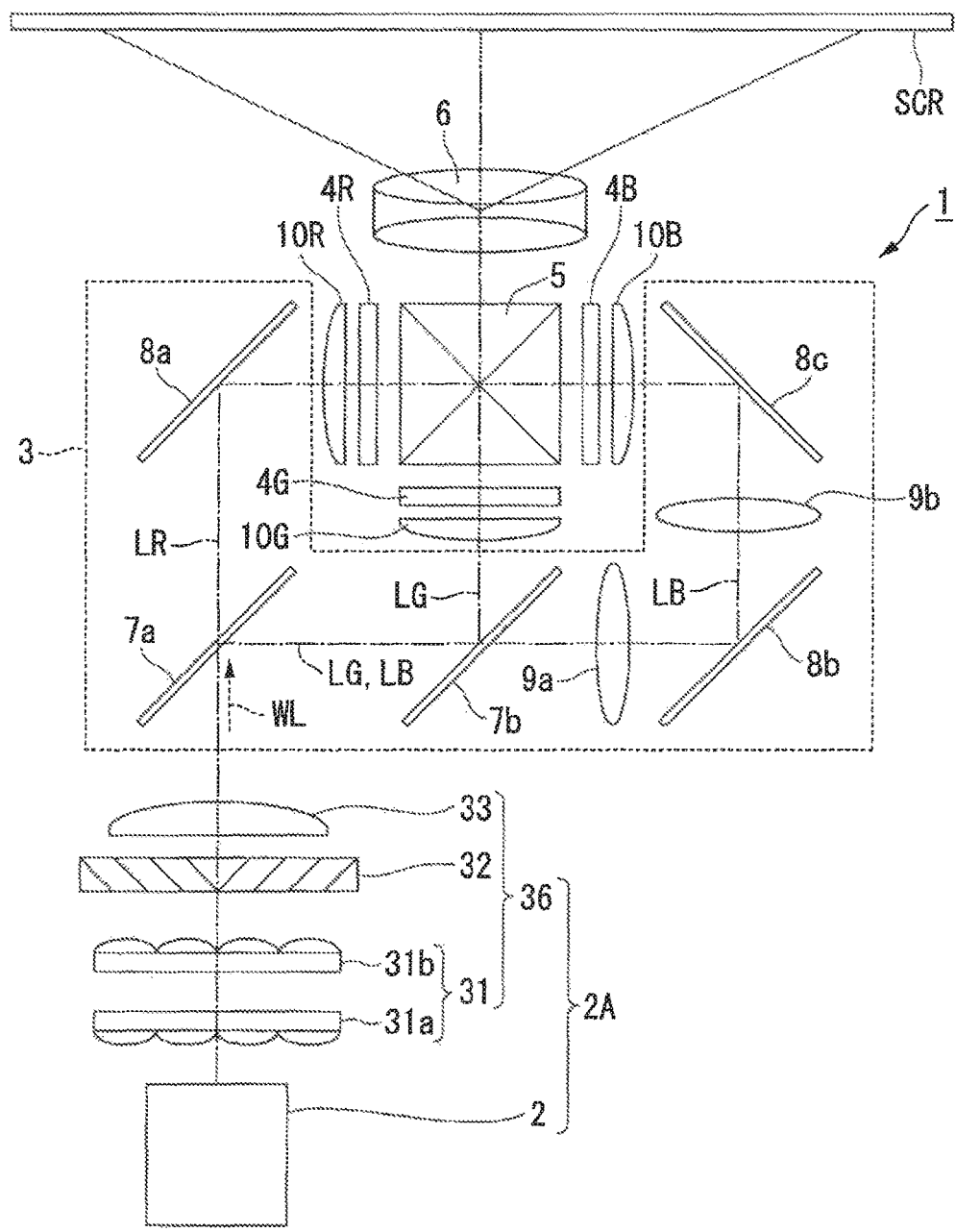
FIG. 1 shows a schematic configuration of a projector according to a first embodiment.

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

Projector

FIG. 1 is a plan view showing a schematic configuration of a projector 1 according to the present embodiment.

The projector 1 according to the present embodiment is a projection-type image display apparatus that displays a color video (images) on a screen (projection surface) SCR, as shown in FIG. 1. The projector 1 uses three light modulators corresponding to color light fluxes, red light LR, green light LG, and blue light LB. The projector 1 uses a semiconductor laser (laser light source), which produces high-luminance, high-power light, as a light source of an illuminator.

Specifically, the projector 1 includes an illuminator 2A, a color separation system 3, a light modulator 4R, a light modulator 4G, a light modulator 4B, a light combining system 5, and a projection system 6.

The illuminator 2A outputs illumination light WL as illumination light toward the color separation system 3. The illuminator 2A includes a light source apparatus 2 and a uniform illumination system 36.

The uniform illumination system 36 includes an optical integration system 31, a polarization conversion element 32, and a superimposing system 33. The polarization conversion element 32 is not essentially required. The uniform illumination system 36 homogenizes the in-illuminated-area intensity distribution of the illumination light WL outputted from the light source apparatus 2.

The optical integration system 31 is formed, for example, of a lens array 31a and a lens array 31b. The lens arrays 31a and 31b are each formed of a plurality of lenses arranged in an array.

The illumination light WL having passed through the optical integration system 31 is incident on the polarization conversion element 32. The polarization conversion element 32 is formed, for example, of polarization separation films and retardation films and converts the illumination light WL into linearly polarized light.

The illumination light WL having passed through the polarization conversion element 32 enters the superimposing system 33. The superimposing system 33 is formed, for example, of a convex lens. The illumination light WL having exited out of the polarization conversion element 32 is formed of illumination light fluxes WL, and the superimposing system 33 superimposes the illumination light fluxes WL on one another on illuminated areas. In the present embodiment, the optical integration system 31 and the superimposing system 33 homogenize the illuminance distribution in the illuminated areas.

The illumination light WL having exited out of the uniform illumination system 36 enters the color separation system 3.

The color separation system 3 is intended to separate the illumination light WL into the red light LR, the green light LG, and the blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source apparatus 2 into the red light LR and the other light fluxes (green light LG and blue light LB). The first dichroic mirror 7a transmits the red light LR but reflects the other light fluxes (green light LG and blue light LB). On the other hand, the second dichroic mirror 7b separates the other light fluxes into the green light LG and the blue light LB. The second dichroic mirror 7b reflects the green light LG but transmits the blue light LB.

The first total reflection mirror 8a reflects the red light LR having passed through the first dichroic mirror 7a toward the light modulator 4R. The second total reflection mirror 8b and the third total reflection mirror 8c reflect the blue light LB having passed through the second dichroic mirror 7b toward the light modulator 4B.

The green light LG is reflected off the second dichroic mirror 7b toward the light modulator 4G.

The first relay lens 9a and the second relay lens 9b are disposed in the optical path of the blue light LB and on the light exiting side of the second dichroic mirror 7b.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each formed, for example, of a transmissive liquid crystal panel. A pair of polarizers (not shown) are disposed on the light incident side and the light exiting side of the liquid crystal panel.

Field lenses 10R, 10G, and 10B are disposed on the light incident side of the light modulators 4R, 4G, and 4B, respectively.

The light combining system 5 combines the image light fluxes from the light modulators 4R, 4G, and 4B with one another and causes the combined image light to exit toward the projection system 6. The light combining system 5 is, for example, formed of a cross dichroic prism.

The projection system 6 is formed of a projection lens group. The projection system 6 enlarges the combined image light from the light combining system 5 and projects the enlarged image light toward the screen SCR.

Light Source Apparatus

The light source apparatus 2, which is used in the illuminator 2A described above and to which an aspect of the invention is applied, will next be described.

Figure 2:
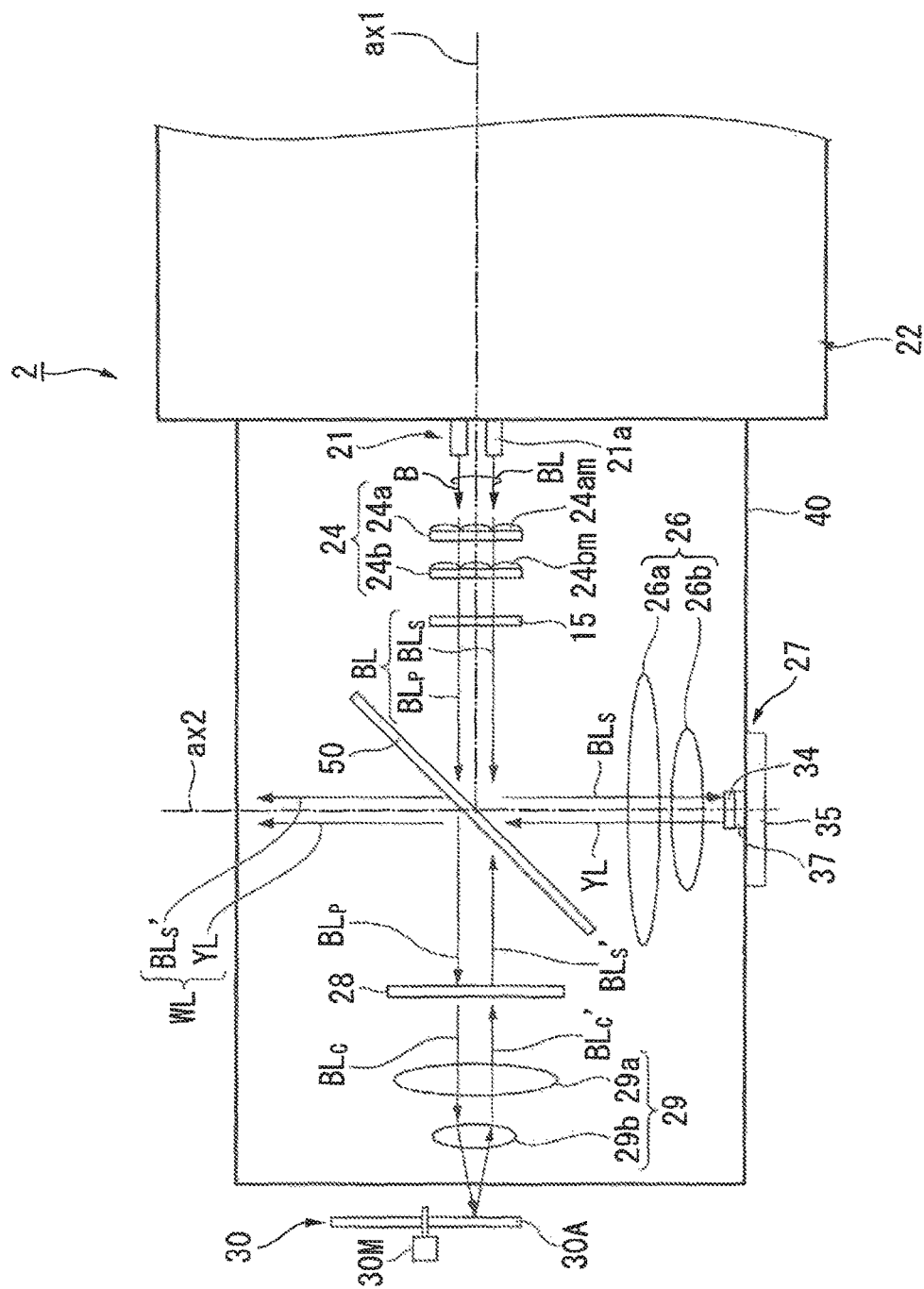
FIG. 2 shows a schematic configuration of a light source apparatus.

FIG. 2 shows a schematic configuration of the light source apparatus 2.

The light source apparatus 2 includes a main body 40, a light source 21, a cooler 22, a homogenizer system 24, a first retardation film 15, a polarization separator 50, a first light collection system 26, a fluorescence emitter 27, a second retardation film 28, a second light collection system 29, and a diffusive reflector 30, as shown in FIG. 2.

The cooler 22, the light source 21, the homogenizer system 24, the first retardation film 15, the polarization separator 50, the second retardation film 28, the second light collection system 29 and the diffusive reflector 30 are sequentially arranged along an optical axis ax1. On the other hand, the fluorescence emitter 27, the first light collection system 26, and the polarization separator 50 are sequentially arranged along an optical axis ax2. The optical axis ax1 and the optical axis ax2 extend in the same plane and are perpendicular to each other.

In the present embodiment, the light source 21, the homogenizer system 24, the first retardation film 15, the polarization separator 50, the first light collection system 26, the second retardation film 28, and the second light collection system 29 are accommodated in the main body 40. The fluorescence emitter 27 and the cooler 22 are supported by the main body 40. The configuration of the main body 40 and the support structure formed of the main body 40 will be described later. The main body 40 corresponds to the "support member" described in the appended claims.

The light source 21 includes a plurality of semiconductor lasers 21a. The plurality of semiconductor lasers 21a are arranged in an array (for example, four in present embodiment) in a plane perpendicular to the optical axis ax1. The semiconductor lasers 21a each emit, for example, a blue light ray B (laser beam having peak wavelength of 460 nm, for example) as excitation light that will be described later. Although not shown, the light ray B emitted from each of the semiconductor lasers 21a is outputted after converted by a collimator lens into parallelized light. In the present embodiment, the light source 21 outputs a light ray flux BL formed of a plurality of light rays B. The number of semiconductor lasers 21a is not limited to a specific number. In the present embodiment, the semiconductor lasers 21a correspond to the "light emitter" described in the appended claims.

The light ray flux BL enters the homogenizer system 24. The homogenizer system 24 is formed, for example, of a first lens array 24a and a second lens array 24b. The first lens array 24a includes a plurality of first lenslets 24am, and the second lens array 24b includes a plurality of second lenslets 24bm.

The light ray flux BL having passed through the homogenizer system 24 is incident on the first retardation film 15.

The first retardation film 15 is, for example, a rotatable half-wave plate. The light rays B emitted from the semiconductor lasers 21a are each linearly polarized light. Appropriately setting the angle of rotation of the half-wave plate allows each of the light rays B having passed through the first retardation film 15 to be light containing an S-polarized component and a P-polarized component with respect to the polarization separator 50 mixed with each other at a predetermined ratio. The ratio between the S-polarized component and the P-polarized component can be changed by rotation of the first retardation film 15.

The polarization separator 50 is formed, for example, of a dichroic mirror having wavelength selectivity. The polarization separator 50 is so disposed as to incline by 45° with respect to the optical axes ax1 and ax2.

The polarization separator 50 separates the light ray flux BL having passed through the first retardation film 15 into the S-polarized component and the P-polarized component with respect to the polarization separator 50. The S-polarized component (light ray flux BLs) is reflected off the polarization separator 50 and directed toward the fluorescence emitter 27. The P-polarized component (light ray flux BLp) passes through the polarization separator 50 and travels toward the diffusive reflector 30.

The polarization separator 50 transmits fluorescence YL, which will be described later and belongs to a wavelength band different from the wavelength band to which the light ray flux BL belongs, irrespective of the state of polarization of the fluorescence YL. The polarization separator 50 further has a light combining function of combining light reflected off the diffusive reflector 30, which will be described later, with the fluorescence YL.

The light ray flux BLs having exited out of the polarization separator 50 enters the first light collection system 26. The first light collection system 26 collects the light ray flux BLs and directs the collected light ray flux BLs toward a phosphor layer 34 of the fluorescence emitter 27. The first light collection system 26 cooperates with the homogenizer system 24 to homogenize the illuminance distribution of the light ray flux BLs on the phosphor layer 34. The first light collection system 26 is formed, for example, of pickup lenses 26a and 26b. The light ray flux BLs corresponds to the "excitation light" in the appended claims.

The light ray flux BLs having exited out of the first light collection system 26 is incident on the fluorescence emitter 27. In the present embodiment, the fluorescence emitter 27 is disposed in the focal position of the first light collection system 26.

The fluorescence emitter 27 includes the phosphor layer 34, a substrate 35, which supports the phosphor layer 34, and a reflector 37, which is provided between the phosphor layer 34 and the substrate 35.

In the present embodiment, the fluorescence emitter 27 is supported by the main body 40 in such a way that the phosphor layer 34 faces the first light collection system 26. The structure in which the main body 40 supports the fluorescence emitter 27 will be described later.

The phosphor layer 34 contains phosphor particles that absorb the light ray flux BLs, convert the light ray flux BLs into the yellow fluorescence YL, and emit the fluorescence YL. The phosphor particles can, for example, be a YAG-based (yttrium-aluminum-garnet-based) phosphor.

To form the phosphor layer 34, it is preferable to employ, for example, a phosphor layer in which phosphor particles are dispersed in an inorganic binder, such as alumina, or a phosphor layer formed of sintered phosphor particles with use of no binder.

Part of the fluorescence YL produced in the phosphor layer 34 is reflected off the reflector 37 and exits out of the phosphor layer 34. The fluorescence YL thus efficiently exits out of the phosphor layer 34 toward the first light collection system 26. The fluorescence YL emitted from the phosphor layer 34 passes through the first light collection system 26 and the polarization separator 50.

On the other hand, the light ray flux BLp having exited out of the polarization separator 50 is incident on the second retardation film 28.

The second retardation film 28 is formed of a quarter-wave plate (λ/4 plate). The P-polarized light ray flux BLp is converted into circularly polarized light ray flux BLc when passing through the second retardation film 28, and the light ray flux BLc enters the second light collection system 29.

The second light collection system 29 collects the light ray flux BLc and directs the collected light ray flux BLc toward the diffusive reflector 30. The second light collection system 29 is formed, for example, of pickup lenses 29a and 29b. The second light collection system 29 cooperates with the homogenizer system 24 to homogenize the illuminance distribution of the light ray flux BLc on the diffusive reflector 30. In the present embodiment, the diffusive reflector 30 (diffusive reflection plate 30A) is disposed in the focal position of the second light collection system 29.

The diffusive reflector 30 diffusively reflects the light ray flux BLc having exited out of the second light collection system 29 toward the polarization separator 50. The light reflected off the diffusive reflector 30 is referred to as a light ray flux BLc'. The diffusive reflector 30 preferably reflects the light ray flux BLc incident thereon in a Lambertian reflection scheme.

The diffusive reflector 30 includes a diffusive reflection plate 30A and a motor 30M for rotating the diffusive reflection plate 30A around the optical axis ax1.

The circularly polarized light ray flux BLc' (diffused light) having been reflected off the diffusive reflection plate 30A and having passed through the second light collection system 29 again passes through the second retardation film 28 again to form S-polarized light beam flux BLs'.

The light ray flux BLs' (blue light) is combined with the fluorescence YL having passed through the polarization separator 50 into white illumination light WL. The illumination light WL enters the uniform illumination system 36 (optical integration system 31) shown in FIG. 1.

The phosphor layer 34, when it produces the fluorescence YL, generates heat. When the temperature of the phosphor layer 34 increases, the fluorescence emission efficiency decreases, and bright fluorescence YL cannot therefore be produced. To avoid the problem, the fluorescence emitter 27 in the present embodiment dissipates the heat in the phosphor layer 34 via the main body 40.

Figure 3:
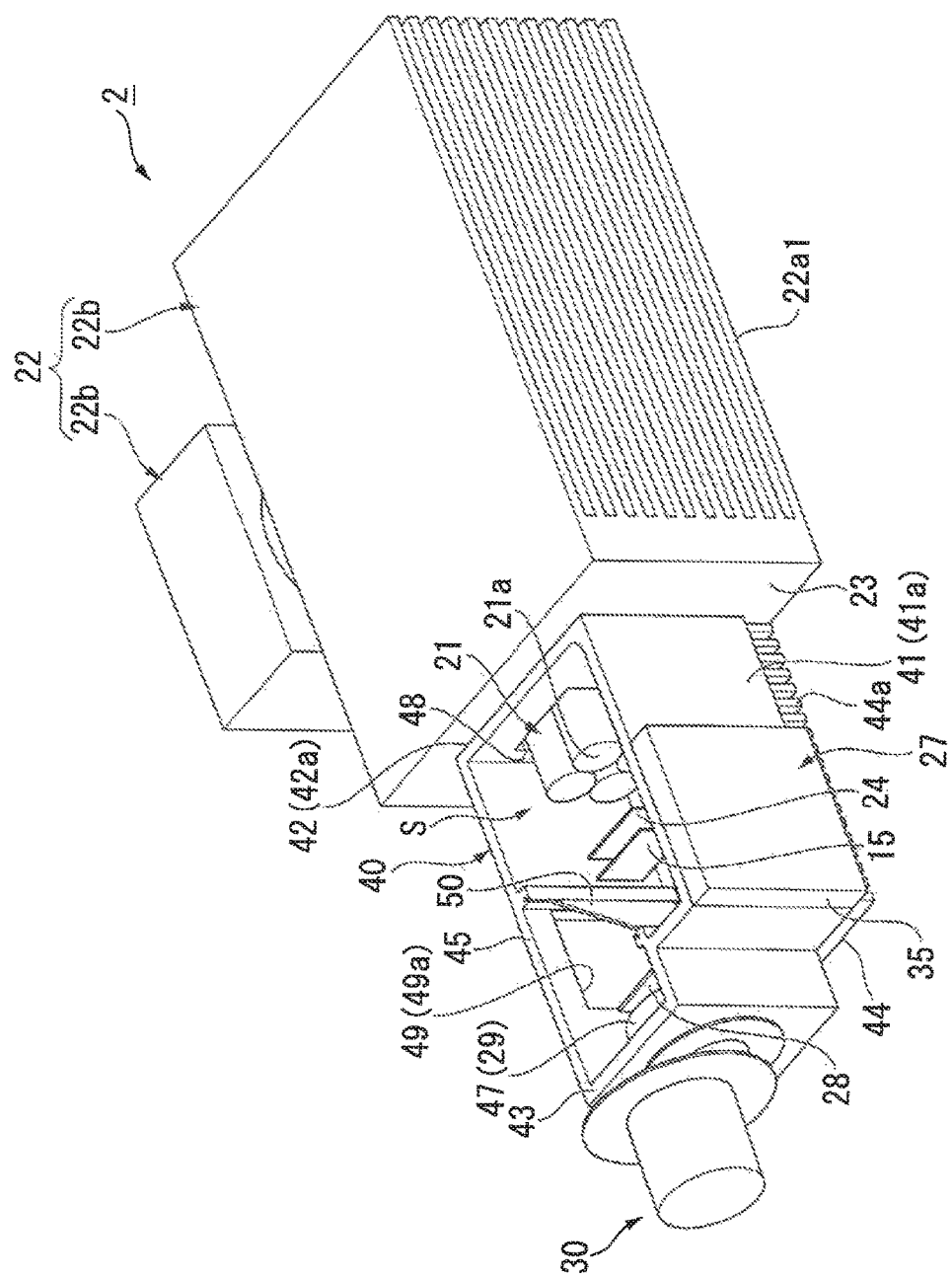
FIG. 3 is a perspective view showing the configuration of a main body and a configuration therearound.

The configuration of the main body 40 will be described below. FIG. 3 is a perspective view showing the main body 40 and constituent members therearound. In FIG. 3, an upper plate section of the main body 40 is omitted for clarity.

The main body 40 is formed of a case member made of a metal, as shown in FIG. 3. The main body 40 has an accommodation space S. The accommodation space S accommodates the light source 21, the homogenizer system 24, the first retardation film 15, the polarization separator 50, the first light collection system 26 (see FIG. 4), the second retardation film 28, and the second light collection system 29.

The main body 40 includes a first side plate section 41, which faces the first light collection system 26, a second side plate section 42, which faces the homogenizer system 24, a third side plate section 43, which faces the second light collection system 29, a fourth side plate section 44, and a fifth side plate section 45.

The second side plate section 42 is a member that extends in a direction that intersects (is perpendicular to) the first side plate section 41. In the present embodiment, the second side plate section 42 extends in the direction perpendicular to the first side plate section 41.

The third side plate section 43 is a member that faces the second side plate section 42 and extends in a direction that intersects (is perpendicular to) the first side plate section 41.

The fourth side plate section 44 is a member that extends in a direction that intersects (is perpendicular to) the first side plate section 41, the second side plate section 42, and the third side plate section 43, and the fourth side plate section 44 forms a lower plate section of the main body 40.

The fifth side plate section 45 is a member that faces the first side plate section 41 and extends in a direction that intersects (is perpendicular to) the second side plate section 42, the third side plate section 43, and the fourth side plate section 44. The fifth side plate section 45 is located on the side toward which the fluorescence YL from the phosphor layer 34 exits. The fifth side plate section 45 includes a light exit section 49, which transmits the fluorescence YL emitted from the phosphor layer 34. The light exit section 49 is formed of a through hole 49a, which passes through the fifth side plate section 45.

Figure 4:
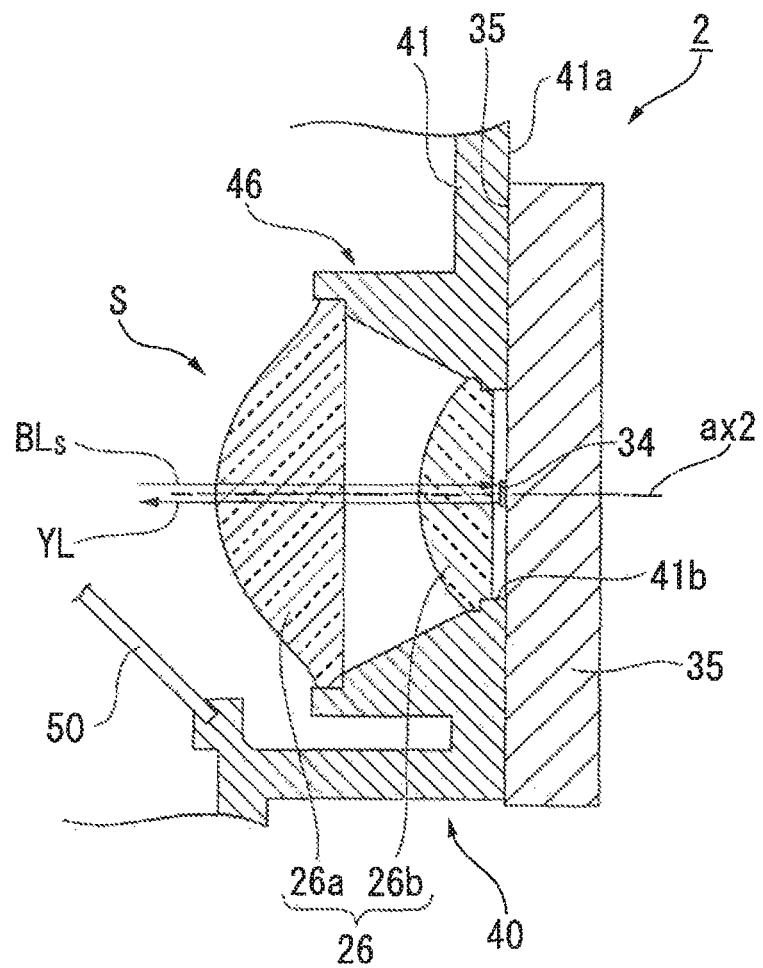
FIG. 4 is a key part enlarged cross-sectional view of the main body.

FIG. 4 is a key part enlarged cross-sectional view of the main body 40. In FIG. 4, the reflector 37 is omitted. The first light collection system 26 is provided on the optical path of the light ray flux BLs (excitation light) in the accommodation space S, as shown in FIG. 4. In the present embodiment, a first lens holder 46, which holds the first light collection system 26 (pickup lenses 26a and 26b), is formed on the side facing the inner surface of the first side plate section 41 of the main body 40. The first lens holder 46 is so integrated with the main body 40.

The fluorescence emitter 27 in the present embodiment is provided on the optical path of the light ray flux BLs having passed through the first light collection system 26. In the present embodiment, the substrate 35 is supported by an outer surface 41a of the first side plate section 41 of the main body 40 in such a way that the phosphor layer 34 faces the first light collection system 26. In the present embodiment, the outer surface 41a corresponds to the "first surface" described in the appended claims.

The main body 40 in the present embodiment has an opening 41b, which transmits the light ray flux BLs.

In the present embodiment, the substrate 35 is so supported by the main body 40 as to cover the opening 41b from the side facing the exterior of the main body 40, that is, the side facing the outer surface 41a.

The substrate 35, specifically, part of a support surface 35a, which supports the phosphor layer 34, is thermally connected to the main body 40. The state in which two members are thermally connected to each other means a state in which heat is transferable between the two members and includes not only a state in which the two members are in direct contact with each other but a state in which the two members are in indirect contact with each other via a thermally conductive member.

In the present embodiment, since the support surface 35a is in direct contact with the first side plate section 41, the heat in the phosphor layer 34 is efficiently transferred to the main body 40 via the substrate 35. The heat in the phosphor layer 34 can therefore be efficiently dissipated with no heat sink provided on the rear surface of the substrate 35 (surface opposite support surface 35a).

The second side plate section 42 of the main body 40 has a through hole 48. The light source 21 is so disposed as to face the homogenizer system 24 through the through hole 48.

The cooler 22 includes a heat sink 22a and a cooling fan 22b. The heat sink 22a is formed of a highly dissipative metal member. The heat sink 22a has a support surface 23, which supports the light source 21, and a plurality of fins 22a1, which are provided on the side opposite the support surface 23. The cooling fan 22b delivers air to the plurality of fins 22a1 of the heat sink 22a to cool the heat sink 22a.

The light source 21 is mounted on the support surface 23 of the heat sink 22a and is therefore thermally connected to the cooler 22. The heat generated by the light source 21 is thus dissipated via the cooler 22.

Further, the support surface 23 of the heat sink 22a is thermally connected to an outer surface 42a of the second side plate section 42 of the main body 40. The outer surface 42a of the second side plate section 42 is a surface that extends in a direction that intersects the outer surface 41a of the first side plate section 41. In the present embodiment, the surface 42a extends in a direction perpendicular to the outer surface 41a and corresponds to the "second surface" described in the appended claims. The heat in the phosphor layer 34 is therefore dissipated via the substrate 35 and the main body 40 and out of the cooler 22.

The second light collection system 29 is provided on the optical path of the light ray flux BLp (see FIG. 2) in the accommodation space S. In the present embodiment, a second lens holder 47, which holds the second light collection system 29 (pickup lenses 29a and 29b), is formed on the side facing the inner surface of the third side plate section 43 of the main body 40. The second lens holder 47 is integrated with the main body 40.

A plurality of fins 44a are provided on the outer surface of the fourth side plate section 44 of the main body 40. The heat transferred from the phosphor layer 34 to the main body 40 can therefore be efficiently dissipated via the plurality of fins 44a.

In the light source apparatus 2 according to the present embodiment, since the substrate 35 is thermally connected to the main body 40, the heat in the phosphor layer 34 can be efficiently dissipated via the substrate 35 and the main body 40. No heat sink therefore needs to be disposed on the rear surface of the substrate 35, allowing reduction in the size of the light source apparatus 2.

Further, the configuration in which the cooler 22 for dissipating the heat generated by the light source 21 is provided on the outer surface 42a of the second side plate section 42 of the main body 40 can prevent the size of the light source apparatus 2 from increasing along the optical axis ax2 of the light source apparatus 2 (in direction perpendicular to outer surface 41a).

The present embodiment can therefore provide the light source apparatus 2 that is compact and allows efficient cooling of the phosphor layer. The projector 1 according to the present embodiment including the light source apparatus 2 can therefore be compact and project bright image light.

Second Embodiment

A light source apparatus according to a second embodiment will be subsequently described. The present embodiment differs from the embodiment described above in terms of the main body and constituent members therearound. Therefore, configurations and members common to those in the embodiment described above have the same reference characters, and descriptions of the same configurations and members will be omitted or simplified.

Figure 5:
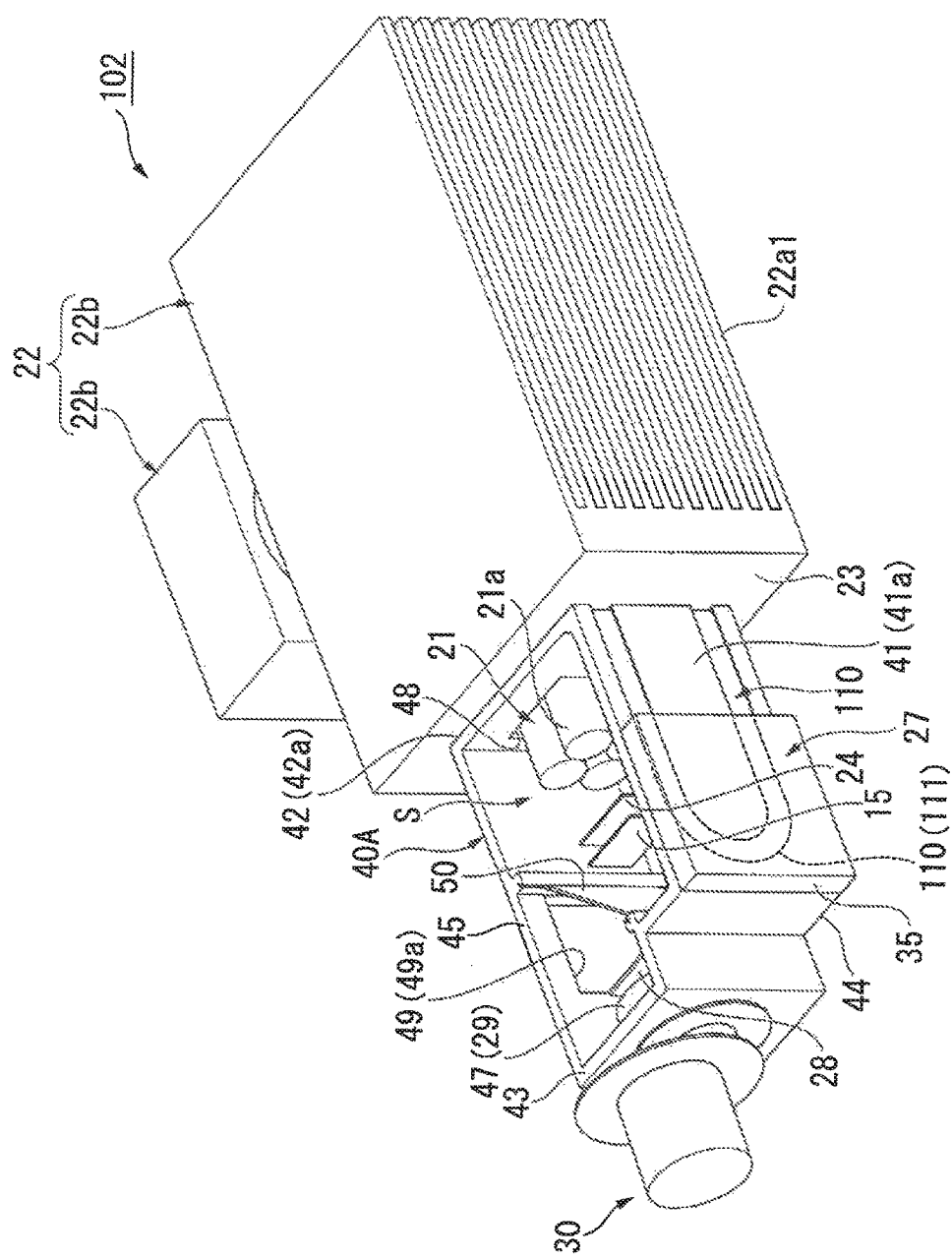
FIG. 5 is a perspective view showing a main body of a light source apparatus according to a second embodiment and a configuration around the main body.
Figure 6:
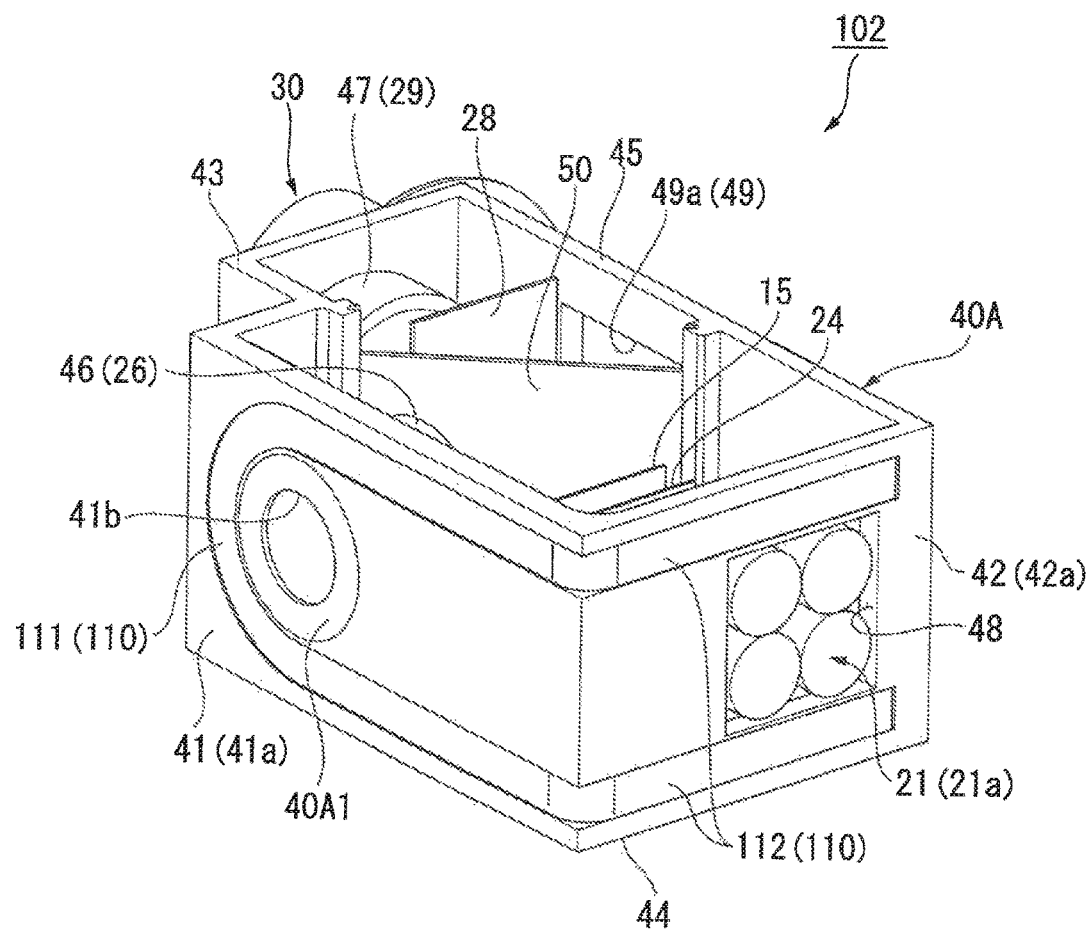
FIG. 6 is a perspective view of the main body and the configuration therearound viewed in a direction different from the viewing direction in FIG. 5.
Figure 7:
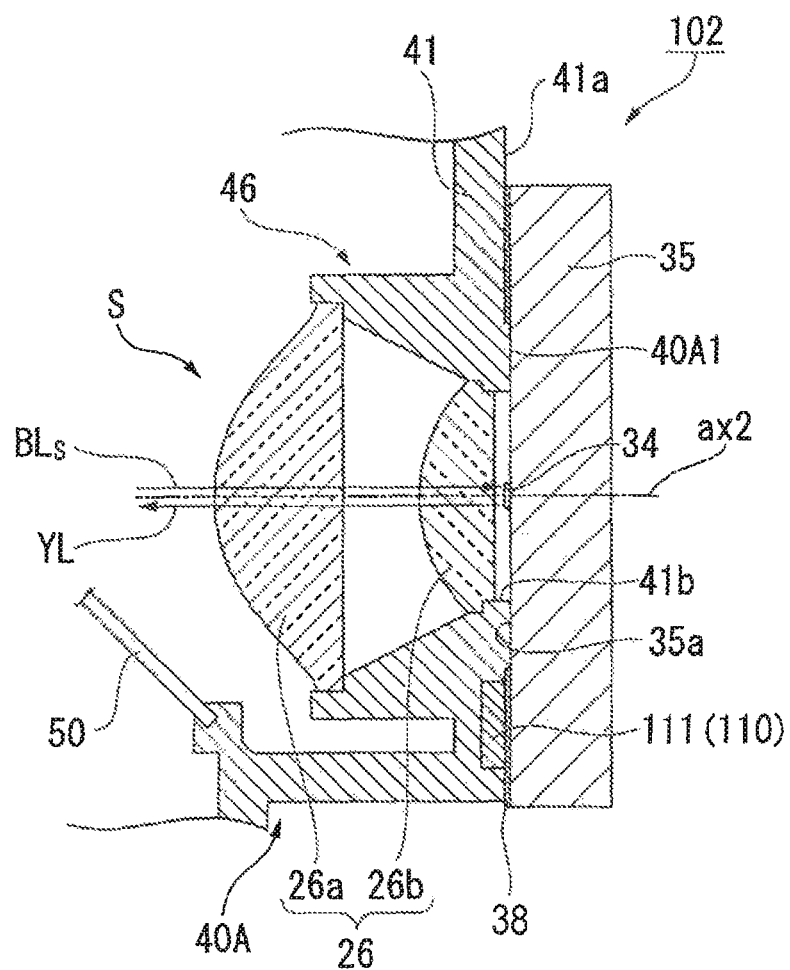
FIG. 7 is a key part enlarged cross-sectional view of the main body.

The configuration of the light source apparatus according to the present embodiment will be described below. In the following sections, the main body and constituent members therearound will be primarily described. FIG. 5 is a perspective view showing a main body 40A of a light source apparatus 102 according to the present embodiment and constituent members around the main body 40A. FIG. 6 is a perspective view of the main body 40A and constituent members therearound viewed in a direction different from the viewing direction in FIG. 5. FIG. 7 is a key part enlarged cross-sectional view of the main body 40A. In FIGS. 5 and 6, an upper plate section of the main body 40A is omitted for clarity.

The light source apparatus 102 according to the present embodiment further includes a heat transporting member 110 provided as part of the main body 40A, as shown in FIGS. 5 to 7. The heat transporting member 110 is formed, for example, of a heat pipe. A heat pipe is a component that moves heat by using evaporation and condensation of a working fluid flowing through a pipe having high thermal conductivity.

Specifically, the heat transporting member 110 is provided along the outer surface 41a of the first side plate section 41 and the outer surface 42a of the second side plate section 42 and buried under the surface of the main body 40A, as shown in FIG. 6.

The heat transporting member 110 includes a heat receiver 111 and a heat dissipater 112. The heat receiver 111 receives heat by using the phenomenon in which latent heat is absorbed when the working fluid evaporates. On the other hand, the heat dissipater 112 dissipates heat by using the phenomenon in which latent heat is released when the working fluid condenses.

In the present embodiment, the heat receiver 111 is provided under the outer surface 41a, and the heat dissipater 112 is provided under the outer surface 42a.

The thus configured heat transporting member 110 transports the heat absorbed from the phosphor layer 34 via the substrate 35 provided on the outer surface 41a to the heat sink 22a provided on the outer surface 42a.

Specifically, the heat receiver 111 is provided in an area inside the outer circumference of the substrate 35, as indicated with the broken lines in FIG. 5. The heat receiver 111 can thus efficiently absorb the heat from the substrate 35.

In the present embodiment, a thermally conductive member 38 is disposed between the substrate 35 and the outer surface 41a. The thermally conductive member 38 is, for example, thermally conductive grease.

The main body 40A in the present embodiment has a protrusion 40A1, which protrudes outward from the main body 40A, on the outer surface 41a but in a ring-shape area that surrounds the opening edge of the opening 41b. The substrate 35 is in contact with the protrusion 40A1 in an area that surrounds the phosphor layer 34 on the substrate 35. The protrusion 40A1 is in contact with the substrate 35, so that the ring-shaped protrusion 40A1 surrounds the phosphor layer 34.

The thermally conductive member 38 is disposed on the outer surface 41a outside the protrusion 40A1 but in the gap between the outer surface 41a and the substrate 35. That is, the thermally conductive member 38 is provided in an area outside the area where the substrate 35 is in contact with the main body 40A.

Part of the heat in the phosphor layer 34 is transferred to the main body 40A via the protrusion 40A1 and the thermally conductive member 38, further transferred to the cooler 22, and dissipated via the heat sink 22a. The remainder of the heat in the phosphor layer 34 is transferred to the cooler 22 along the path including the thermally conductive member 38, the heat receiver 111, and the heat dissipater 112 and dissipated via the heat sink 22a.

The thermally conductive member 38 emits gas and foreign matter in some cases due to degradation over time. The emitted gas and foreign matter, if they adhere to the phosphor layer 34, contaminate the surface of the phosphor layer 34, resulting in risks of a decrease in the light conversion efficiency and damage due to an increase in temperature.

In contrast, in the main body 40A in the present embodiment, since the thermally conductive member 38 is disposed in an area outside the area where the substrate 35 is in contact with the main body 40A, the phosphor layer 34 is isolated from the gas and foreign matter emitted from the thermally conductive member 38. The problems of a decrease in the light conversion efficiency and damage of the phosphor layer 34 due to the contamination of the surface of the phosphor layer 34 are therefore avoided.

The light source apparatus 102 according to the present embodiment in combination with the heat transporting member 110 allows efficient dissipation of the heat in the phosphor layer 34. Further, since the heat transporting member 110 is buried under the surface of the main body 40A, the size of the light source apparatus 102 can be reduced, as in the case of the configuration in the first embodiment.

Third Embodiment

A light source apparatus according to a third embodiment will be subsequently described. The present embodiment differs from the first embodiment in terms of the main body and constituent members therearound. Therefore, configurations and members common to those in the embodiment described above have the same reference characters, and descriptions of the same configurations and members will be omitted or simplified.

Figure 8:
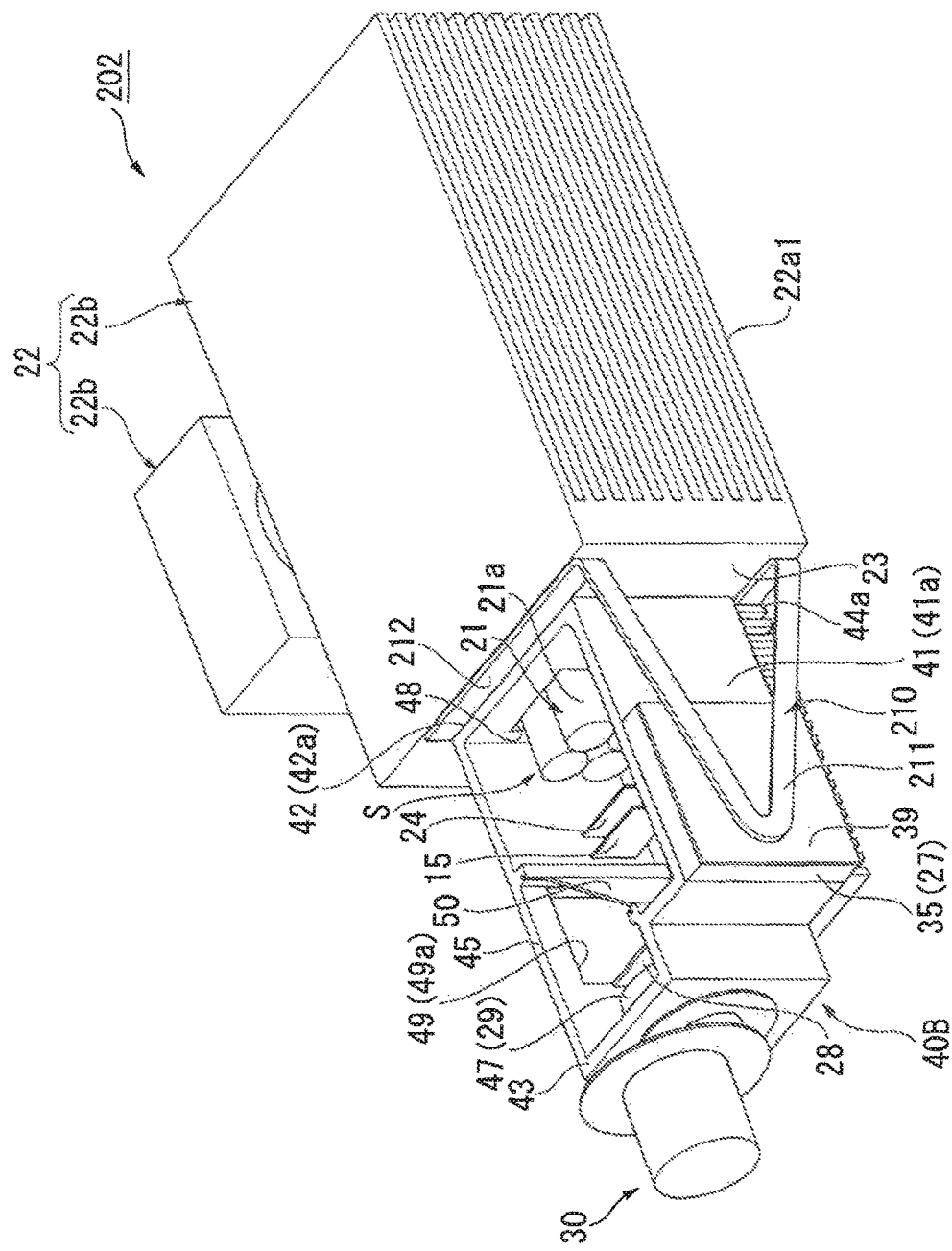
FIG. 8 is a perspective view showing a main body of a light source apparatus according to a third embodiment and a configuration around the main body.

The configuration of the light source apparatus according to the present embodiment will be described below. In the following sections, the main body 40B and constituent members therearound will be primarily described. FIG. 8 is a perspective view showing a main body 40B of a light source apparatus 202 according to the present embodiment and constituent members around the main body 40B. In FIG. 8, an upper plate section of the main body 40B is omitted for clarity. The main body 40B has the same configuration as that of the main body 40 in the first embodiment. That is, the substrate 35 is directly connected to the outer surface 41a of the first side plate section 41.

The light source apparatus 202 according to the present embodiment includes a heat transporting member 210 provided as part of the main body 40B, as shown in FIG. 8. The heat transporting member 210 in the present embodiment is disposed in a position different from the position where the heat transporting member 110 in the second embodiment is disposed.

In the present embodiment, the heat transporting member 210 is provided along the substrate 35 and the support surface 23 of the heat sink 22a. The heat transporting member 210 includes a heat receiver 211 and a heat dissipater 212.

The heat receiver 211 is fixed to a connection plate 39, which is provided on the rear surface of the substrate 35, via screw members that are not shown, and the heat dissipater 212 is thermally connected to the support surface 23 of the heat sink 22a. The connection plate 39 is intended to thermally connect the heat receiver 211 to the substrate 35 and formed of a copper plate, which excels in heat conductivity.

In the present embodiment, part of the heat in the substrate 35 is transferred to the main body 40B, and the remainder of the heat in the substrate 35 is transferred to the heat receiver 211 via the connection plate 39.

The light source apparatus 202 according to the present embodiment in combination with the heat transporting member 210 allows efficient dissipation of the heat in the phosphor layer 34. Further, since the heat transporting member 210 is provided on the rear surface of the substrate 35, the cost can be suppressed as compared with the cost required for the configuration in the second embodiment, in which the heat transporting member 110 is buried under the surface of the main body 40A. Moreover, the size of the light source apparatus 202 in the direction along the optical axis ax2 can be reduced, as compared with the configuration in which a heat sink is disposed on the rear surface of the substrate 35.

The invention is not limited to the contents of the embodiments described above and can be changed as appropriate to the extent that the change does not depart from the substance of the invention.

For example, the second and third embodiments described above have been described with reference to the case where the heat transporting members 110 and 210 are used to move the heat in the substrate 35 to the heat sink 22a, but not necessarily in the invention.

First Variation

Figure 9:
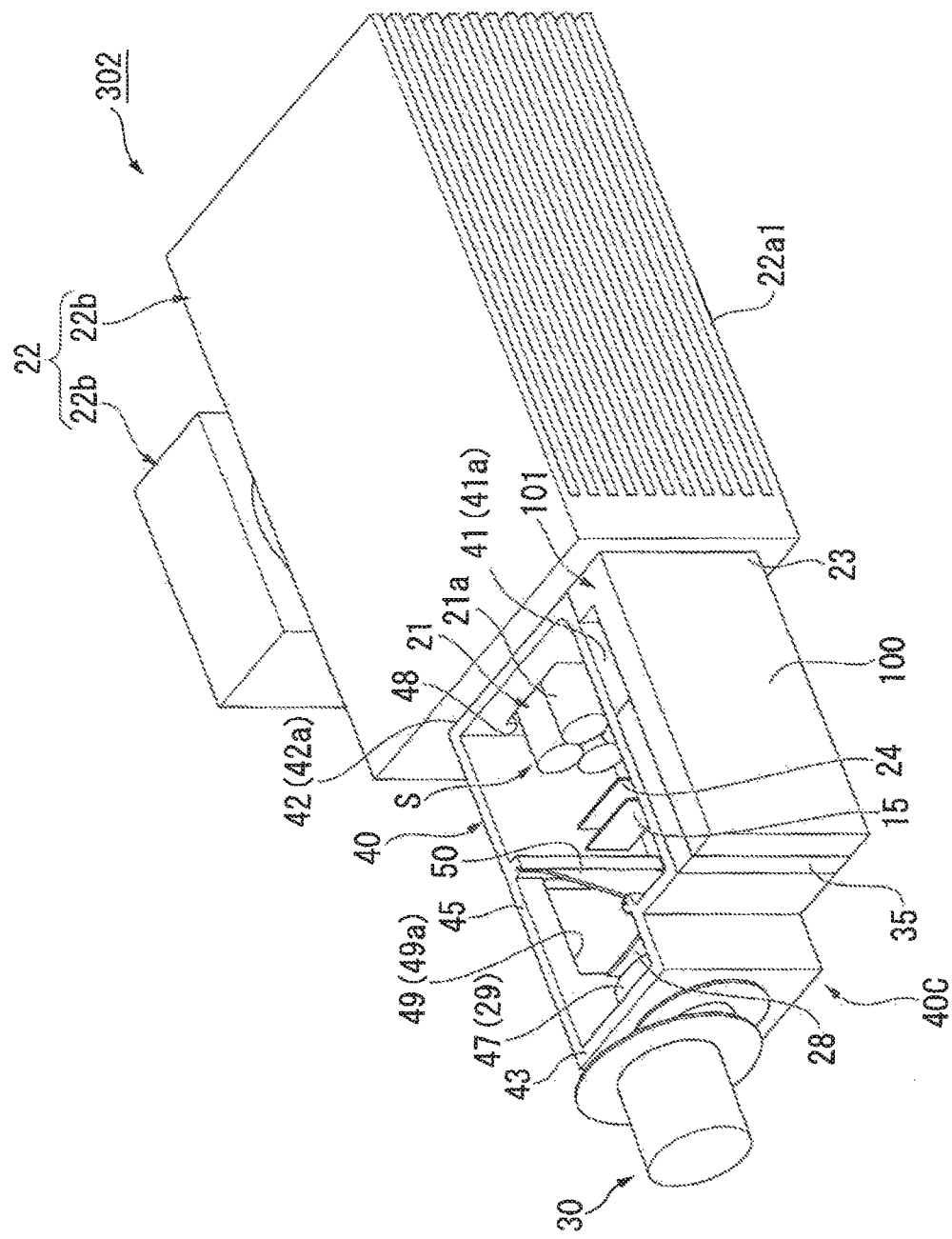
FIG. 9 is a perspective view showing a main body of a light source apparatus according to a first variation and a configuration around the main body.

FIG. 9 is a perspective view showing a main body 40C of a light source apparatus 302 according to a first variation and constituent members around the main body 40C. The main body 40C has the same configuration as that of the main body 40 in the first embodiment. That is, the substrate 35 is directly connected to the outer surface 41a of the first side plate section 41.

In the light source apparatus 302 according to the present variation, a thermally conductive plate 100 is used to move the heat in the substrate 35 to the heat sink 22a, as shown in FIG. 9. The thermally conductive plate 100 is made, for example, of copper, silver, diamond, or any other material that excels in thermal conductivity. The thermally conductive plate 100 is a plate-shaped member that thermally connects the rear surface of the substrate 35 to the support surface 23 of the heat sink 22a. The thermally conductive plate 100 has a roughly L-letter-shaped cross section with an end portion 101 facing the support surface 23 bent toward the main body 40C, and the end portion 101 is connected both to the main body 40C and the support surface 23.

The light source apparatus 302 according to the present variation in combination with the thermally conductive plate 100 allows efficient dissipation of the heat in the phosphor layer 34. Further, the size of the light source apparatus 302 in the direction along the optical axis ax2 can be reduced, as compared with the configuration in which a heat sink is disposed on the rear surface of the substrate 35.

Second Variation

Figure 10:
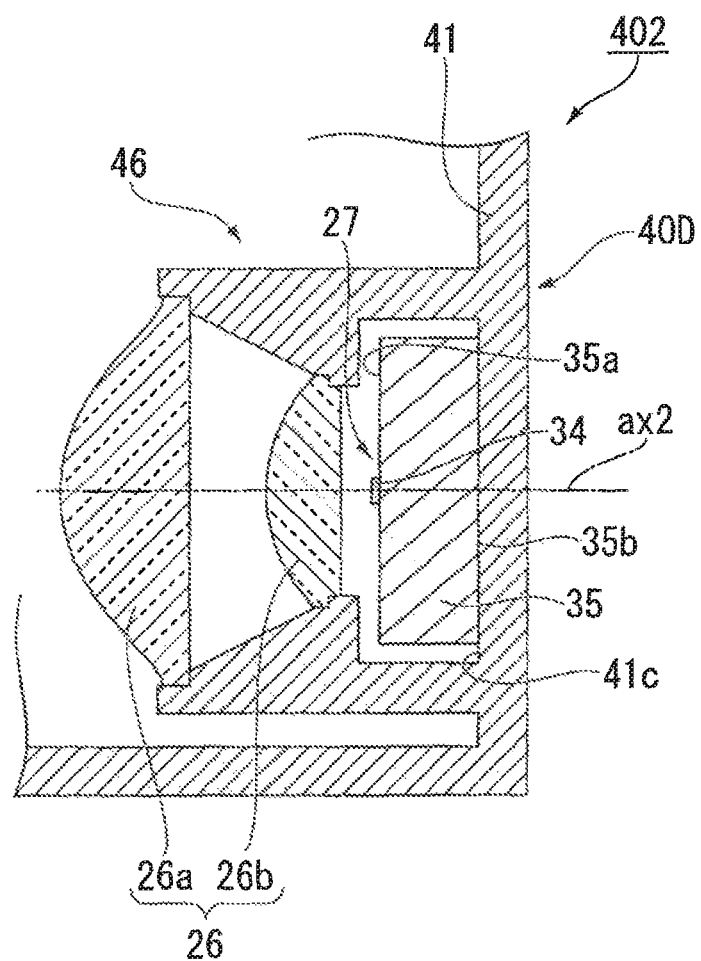
FIG. 10 is a cross-sectional view showing a key part configuration of a main body of a light source apparatus according to a second variation.

FIG. 10 is a cross-sectional view showing a key part configuration of a main body 40D of a light source apparatus 402 according to a second variation. The fluorescence emitter 27 is accommodated in the accommodation space S, as shown in FIG. 10. The substrate 35 of the fluorescence emitter 27 is supported by an inner surface 41c of the first side plate section 41 of the main body 40D in such a way that the phosphor layer 34 faces the first light collection system 26. The inner surface 41c is in direct contact with and therefore thermally connected to a rear surface 35b of the substrate 35 (surface opposite support surface 35a). As a result, the heat in the phosphor layer 34 is efficiently transferred to the main body 40D, whereby the heat in the phosphor layer 34 can be efficiently dissipated.

In the second and third embodiments described above, the plurality of fins 44a may be provided on the outer surface of the fourth side plate section 44, as in the case of the main body 40 in the first embodiment.

In the embodiments described above, the projector 1 including the three light modulators 4R, 4G, and 4B is presented by way of example, and the invention is also applicable to a projector that displays a color video via one light modulator. Further, a digital mirror device may be used as each of the light modulators.

The above embodiments have each been described with reference to the case where the light source apparatus according to the embodiment of the invention is incorporated in a projector, but not necessarily. The light source apparatus according to any of the embodiments of the invention can also be used, for example, in a lighting apparatus and an automobile headlight.

The entire disclosure of Japanese Patent Application No. 2017-075910, filed on Apr. 6, 2017 is expressly incorporated by reference herein.

What is claimed is:

1. A light source apparatus comprising:
a light emitter that emits excitation light;
at least one lens provided on an optical path of the excitation light;
a wavelength conversion element provided on the optical path of the excitation light having passed through the at least one lens, the wavelength conversion element including:
a phosphor layer that faces the at least one lens,
a substrate that supports the phosphor layer, and
a light reflection surface provided between the phosphor layer and the substrate;
a support member that accommodates the light emitter, the at least one lens, and the phosphor layer, the support member having a first surface and a second surface, the first surface having an opening that is provided opposite to the at least one lens, the substrate being thermally connected to the support member, and being so supported by the first surface so as to cover the opening from a side facing an exterior of the support member; and
a cooler for dissipating heat generated by the light emitter, the cooler being provided on the second surface and being thermally connected to the support member.

2. The light source apparatus according to claim 1, wherein
the cooler is provided in contact with the light emitter and in contact with the support member.

3. The light source apparatus according to claim 1, further comprising a heat transporting member including a heat receiver and a heat dissipater,
wherein the heat receiver receives heat generated in the phosphor layer, and the heat dissipater transfers the heat to the cooler.

4. The light source apparatus according to claim 3, wherein
the heat receiver is provided in an area inside an outer circumference of the substrate.

5. The light source apparatus according to claim 1, further comprising a thermally conductive material provided between the substrate and the support member,
wherein the substrate is in contact with the support member in an area that surrounds the phosphor layer, and
the thermally conductive material is provided in an area outside an area where the substrate is in contact with the support member.

6. A projector comprising:
the light source apparatus according to claim 1;
a light modulator that modulates light from the light source apparatus in accordance with image information to produce image light; and
a projection system that projects the image light.

7. A projector comprising:
the light source apparatus according to claim 2;
a light modulator that modulates light from the light source apparatus in accordance with image information to produce image light; and
a projection system that projects the image light.

8. A projector comprising:
the light source apparatus according to claim 3;
a light modulator that modulates light from the light source apparatus in accordance with image information to produce image light; and
a projection system that projects the image light.

9. A projector comprising:
the light source apparatus according to claim 4;
a light modulator that modulates light from the light source apparatus in accordance with image information to produce image light; and
a projection system that projects the image light.

10. A projector comprising:
the light source apparatus according to claim 5;
a light modulator that modulates light from the light source apparatus in accordance with image information to produce image light; and
a projection system that projects the image light.

11. A light source apparatus comprising:
a light emitter that emits excitation light;
a support member enclosing an accommodation space on an optical path of the excitation light;
at least one lens provided on the optical path in the accommodation space;
a wavelength conversion element provided on the optical path of the excitation light having passed through the at least one lens, the wavelength conversion element including:
a phosphor layer,
a substrate that is thermally connected to the support member and supports the phosphor layer, the substrate being so supported by the support member that the phosphor layer faces the at least one lens, and
a light reflection surface provided between the phosphor layer and the substrate;
a cooler that dissipates heat generated by the light emitter;
a heat transporting member including a heat receiver that receives heat generated in the phosphor layer and a heat dissipater that transfers the heat to the cooler; and
a light exit section that is included in the support member and that transmits fluorescence emitted from the phosphor layer.

12. The light source apparatus according to claim 11, wherein the support member has a first surface and a second surface extending in a direction that intersects the first surface, the first surface supporting the substrate, the cooler being provided on the second surface.

13. The light source apparatus according to claim 11, wherein
   the support member has an opening that transmits the excitation light,
   the substrate is so supported by the support member as to cover the opening from a side facing an exterior of the support member, and
   the heat receiver is provided in an area inside an outer circumference of the substrate.

14. The light source apparatus according to claim 13, further comprising a thermally conductive material provided between the substrate and the support member,
   wherein the substrate is in contact with the support member in an area that surrounds the phosphor layer, and
   the thermally conductive material is provided in an area outside an area where the substrate is in contact with the support member.

15. A projector comprising:
   the light source apparatus according to claim 11;
   a light modulator that modulates light from the light source apparatus in accordance with image information to produce image light; and
   a projection system that projects the image light.

16. A projector comprising:
   the light source apparatus according to claim 12;
   a light modulator that modulates light from the light source apparatus in accordance with image information to produce image light; and
   a projection system that projects the image light.

17. A projector comprising:
   the light source apparatus according to claim 13;
   a light modulator that modulates light from the light source apparatus in accordance with image information to produce image light; and
   a projection system that projects the image light.

18. A projector comprising:
   the light source apparatus according to claim 14;
   a light modulator that modulates light from the light source apparatus in accordance with image information to produce image light; and
   a projection system that projects the image light.

19. A light source apparatus comprising:
   a light emitter that emits excitation light;
   a support member enclosing an accommodation space on an optical path of the excitation light, the support member having an opening that transmits the excitation light;
   at least one lens provided on the optical path in the accommodation space;
   a wavelength conversion element provided on the optical path of the excitation light having passed through the at least one lens, the wavelength conversion element including:
      a phosphor layer,
      a substrate that is thermally connected to the support member and supports the phosphor layer, the substrate being in contact with the support member in an area that surrounds the phosphor layer, the substrate being so supported by the support member that the phosphor layer faces the at least one lens and the substrate covers the opening from a side facing an exterior of the support member, and
      a light reflection surface provided between the phosphor layer and the substrate;
   a thermally conductive material provided between the substrate and the support member in an area outside an area where the substrate is in contact with the support member; and
   a light exit section that is included in the support member and that transmits fluorescence emitted from the phosphor layer.

20. A projector comprising:
   the light source apparatus according to claim 19;
   a light modulator that modulates light from the light source apparatus in accordance with image information to produce image light; and
   a projection system that projects the image light.

* * * * *